United States Patent
Guan et al.

(10) Patent No.: US 9,459,988 B2
(45) Date of Patent: Oct. 4, 2016

(54) DYNAMIC CODE SWITCHING IN DEBUGGING PROCESS

(71) Applicant: INTERNATIONAL BUSINESS MACHINES CORPORATION, Armonk, NY (US)

(72) Inventors: Xiao Feng Guan, Shanghai (CN); Jin Song Ji, Shanghai (CN); Jian Jiang, Shanghai (CN); Si Yuan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/196,747

(22) Filed: Mar. 4, 2014

(65) Prior Publication Data

US 2014/0289707 A1    Sep. 25, 2014

(30) Foreign Application Priority Data

Mar. 21, 2013   (CN) .......................... 2013 1 0090980

(51) Int. Cl.
*G06F 11/36* (2006.01)
*G06F 9/45* (2006.01)

(52) U.S. Cl.
CPC ....... *G06F 11/3624* (2013.01); *G06F 11/3628* (2013.01); *G06F 11/3664* (2013.01); *G06F 8/443* (2013.01)

(58) Field of Classification Search
CPC .............. G06F 7/78; G06F 8/00–8/78; G06F 9/44–9/455; G06F 11/36
See application file for complete search history.

(56) References Cited

U.S. PATENT DOCUMENTS

| | | | | |
|---|---|---|---|---|
| 5,809,283 | A | * | 9/1998 | Vaidyanathan ..... G06F 17/5022 703/13 |
| 6,041,180 | A | * | 3/2000 | Perks .................... G06F 8/4434 717/151 |
| 6,553,565 | B2 | | 4/2003 | Click, Jr. et al. |
| 7,287,246 | B2 | | 10/2007 | Tan et al. |
| 7,607,123 | B2 | | 10/2009 | Chavan |
| 7,757,222 | B2 | | 7/2010 | Liao et al. |
| 8,108,849 | B2 | | 1/2012 | Adolphson et al. |
| 8,312,438 | B2 | | 11/2012 | Luedde |
| 2002/0100018 | A1 | | 7/2002 | Click, Jr. et al. |

(Continued)

OTHER PUBLICATIONS

Ung et al., Optimising Hot Paths in a Dynamic Binary Translator, 2001.*

(Continued)

*Primary Examiner* — Wei Zhen
*Assistant Examiner* — Zhan Chen
(74) *Attorney, Agent, or Firm* — Law Office of Jim Boice (57) ABSTRACT

An optimized version of a binary and a non-optimized debuggable version of a binary for each compiling unit in the source code program are generated. The optimized versions of binaries of all compiling units are loaded into memory for debugging, which is monitored. In response to determining that a first compiling unit in the source code program is to be debugged, the non-optimized debuggable version of the binary is loaded into a memory location that was previously used by the optimized version of the binary. In response to determining that debugging of a second compiling unit in the source code program is to be cancelled, the optimized version of the binary of the second compiling unit is loaded into a memory location that was previously used by the non-optimized debuggable version of the binary.

20 Claims, 8 Drawing Sheets

(56) References Cited

U.S. PATENT DOCUMENTS

| | | | |
|---|---|---|---|
| 2002/0144245 A1* | 10/2002 | Lueh | G06F 8/41 717/140 |
| 2004/0143814 A1* | 7/2004 | de Jong | G06F 9/44589 717/104 |
| 2006/0064676 A1* | 3/2006 | Chavan | G06F 11/3628 717/124 |
| 2009/0064113 A1* | 3/2009 | Langman | G06F 9/45516 717/148 |
| 2009/0307532 A1* | 12/2009 | Raber | G06F 11/3644 714/38.13 |
| 2011/0271259 A1 | 11/2011 | Moench et al. | |

OTHER PUBLICATIONS

N. Valerjev, "Debugging Optimized Code", Penton, Electronic Design, Jul. 28, 2011, pp. 1-16.

U. Holzle et al., "Debugging Optimized Code With Dynamic Deoptimization", ACM, Proceedings of the ACM SIGPLAN 1992 Conference on Programming Language Design and Implementation, 1992, pp. 32-43.

* cited by examiner

FIG. 1

```
1   int main(int a) {
2     switch (a)
3     {
4       case 1:
5         a++;
6         break;
7       case 2:
8         a--;
9         break;
10        ...
11      default:
12    }
```

FIG. 2

```
              . . .
In 7      .L1:
In 7          MOVE    r3 = r1;
In 8    ●     LOAD    r1 = a[sp];
In 8    ●     ADD     r2 = r1-1;
In 8    ●     STORE   a[sp] = r2;
In 7          MOVE    r1 = r3;
In 9          JUMP    .L3;
In 10     . . .
```

1. Initially load opt bin for each function

2. Reload dbg bin for func1

Determining that func 1 is to be debugged

3. Reload opt bin for func1

Determining that debugging of func 1 is to be cancelled

DYNAMIC CODE SWITCHING IN DEBUGGING PROCESS

This application is based on and claims the benefit of priority from China (CN) Patent Application 201310090980.4, filed on Mar. 21, 2013, and herein incorporated by reference in its entirety.

BACKGROUND

The present invention relates to program debugging, and more specifically, to a method and a system for dynamic code switching in debugging process.

In programming, most applications are debugged at a source code level. The source code is generally written in a high level language. The high level language is defined in comparison with the assembly language and is a kind of programming closer to the natural language and mathematic formula. The high level language is basically independent of the hardware system of the machine, and is used write programs in a way that is more readily understood by the people. Therefore, all of programmers' debugging operations like step through, set break points, etc are based on the view of high level language source code. However, actually, what a debugger receives, runs and operates on is a binary of the program (a compiled version of the source code), so as to generate a result of running. The debugger is responsible for mapping source codes to binary or mapping binary to source codes with the help of debug information generated by the compiler. Debug information provides, for example, the following information: line number of each instruction in the binary, data type of each memory location in binary, etc.

Figure 2:
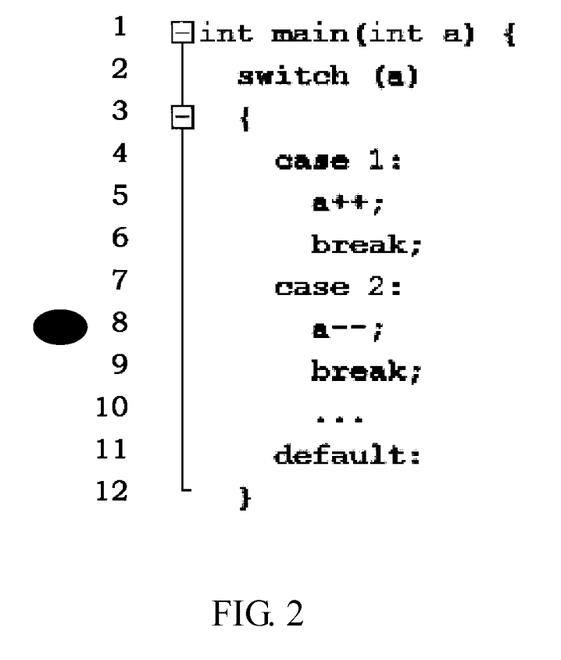
FIGS. 2-5 show a simple debugging process.
Figure 3:
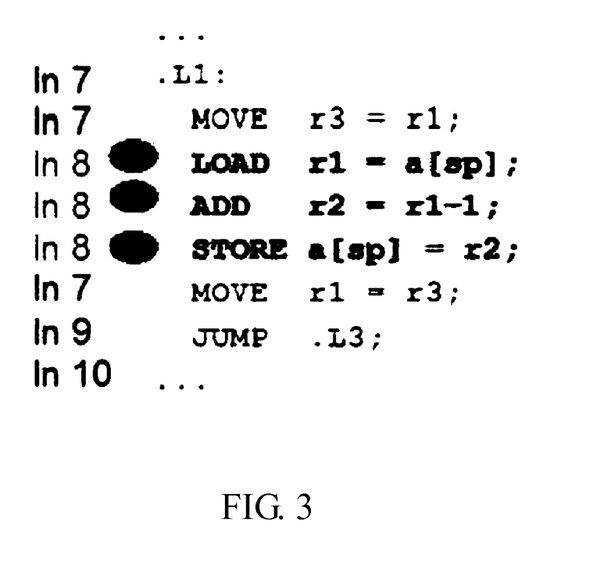
Figure 4:
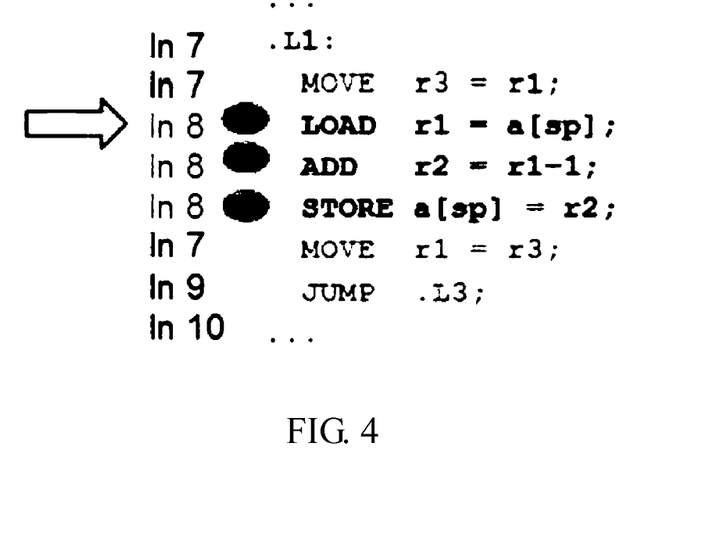
Figure 5:
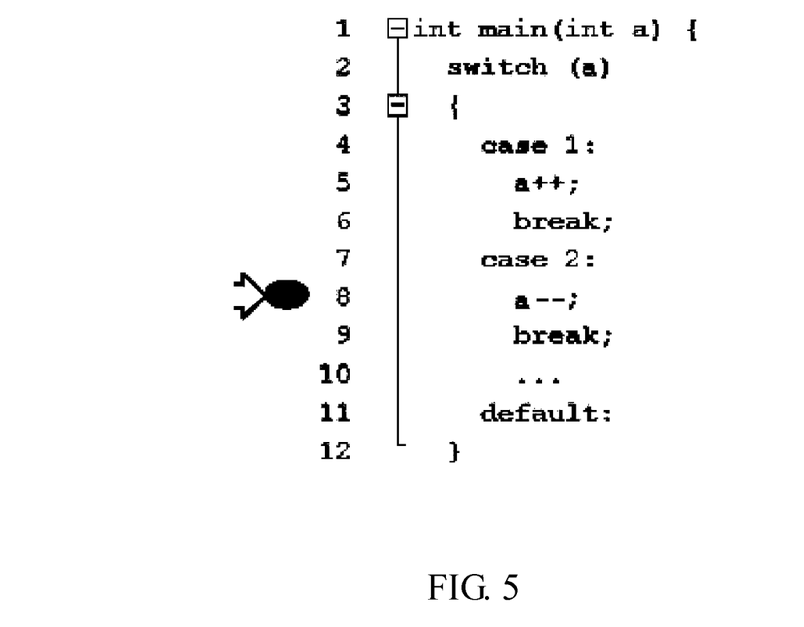

FIGS. 2-5 show a simple debugging process. In FIG. 2, the debugger handles debugging operations on a source code view. Specifically, a break point at line 8 of the source code is set. In FIG. 3, the debugger searches debug information for related binary instructions. Here, it is noted that in order to make binary instructions readable to understand the present invention, FIGS. 3-4 show an assembly language view using mnemonic symbols, which have a direct correspondence with binary instructions. However, in reality, such intermediate assembly language view does not necessarily exist. For example, in FIG. 3, three lines of instructions with the line number 8 correspond to the source code "a—;" at line 8 in FIG. 2. A case where the debugger runs the binary codes and hits the break point is shown in FIG. 4. In FIG. 5, the breakpoint is reflected on the source code view to show to the user. In the whole debugging process, debug information is critical for an accurate and smooth debug. More specifically, the base of this method lies in mapping each instruction in binary to a source code line accurately.

The process of transforming source code to binary is called compiling. To make the execution of binary faster, a compiler usually reduces execution time and size of binary as much as possible but keeps logical identity by compiling, which is called compiler optimization. However, optimization creates lots of troubles for debugging, for example, it moves, changes, splits, merges, or eliminates codes all around, which makes order of source code information totally a mess.

For example, there are the following optimization technologies: a scheduler may disorder instructions to avoid hardware pipeline bubbles, and it's side effect on debugging is that continuous stepping will jump randomly in source code view; loop invariant motion moves computations irrelevant to loop variable out of a loop, and it's side effect on debugging is stepping in and out of a loop body randomly.

Both performance and debuggability are important, but they conflict with each other. Computer professionals have tried many ways to make optimized debugging possible, for example making new debugging information standards. No matter which debugging information standard is used, a common way is to maintain source code information in binary and feed it to the debugger. However, this will not resolve the problem, because in fact binary does not align with source code any more by nature of optimization.

Some techniques have been proposed to provide more accurate debugging experience. For example, a compiler may have an option—qoptdebug. The use of this option for compiling will generate pseudo codes showing optimized high level language. For example, for the following function:

```
void foo(int x, int y, char* w)
{
    char* s = w+1;
    char* t = w+1;
    int z = x + y;
    int d = x + y;
    int a = printf("TEST\n");
    for (int i = 0; i < 4; i++)
        printf("%d %d %d %s %s\n", a, z, d, s, t);
}
``` the following pseudo codes will be generated:

```
1   3 |  void foo(long x, long y, char * w)
2   9 | {
3            a = printf("TEST/n");
4  12 |      @CSE0 = x + y;
5            printf("%d %d %d %s %s/n",a,@CSE0,@CSE0,((char *)w+1),((char *)w+1));
6            printf("%d %d %d %s %s/n",a,@CSE0,@CSE0,((char *)w+1),((char *)w+1));
7            printf("%d %d %d %s %s/n",a,@CSE0,@CSE0,((char *)w+1),((char *)w+1));
8            printf("%d %d %d %s %s/n",a,@CSE0,@CSE0,((char *)w+1),((char *)w+1));
9  13 |      return;
10       }
```

In this case, debugging will be directly based on pseudo codes. This method maps pseudo codes with binary very well, since both of them are optimized codes. However, mapping from original codes to pseudo codes is not readily to be understood. Users may still be confused with debugging unrecognized codes.

To achieve a balance between performance and debuggability, in one known method, for some subroutines, a complier generates both of optimized object code and debuggable object code. According to configuration file, compiler switch, user input, etc, it is determined that, for which subroutines two versions of object codes are generated. When one subroutine is determined to be debugged, it is possible to jump to debuggable object code by inserting a jump instruction in optimized object code of the subroutine. There are problems in the method as follows: upon all subroutines or most of the subroutines are ever debugged, optimized object codes of respective subroutines are jumped to debuggable object codes gradually, until all jump to debuggable object codes, accordingly, the execution speed of the program will become more and more slow; additionally, when the method is used, it is necessary to load both of the two versions of object codes into memory, which greatly consumes memory resource.

SUMMARY

A method, system, and/or computer program product enable dynamic code switching in a debugging process. A first version of a binary and a second version of a binary for each compiling unit in the source code program are generated, where the first version is an optimized version, and wherein the second version is a non-optimized debuggable version. The first version of binaries of all compiling units is loaded in memory for running by a debugger. The debugging operation of the source code program is monitored. In response to determining that a first compiling unit in the source code program is to be debugged, the second version of the binary of the particular compiling unit is dynamically reloaded into a same address in memory as that used by the first version of the binary of the first compiling unit. In response to determining that debugging of a second compiling unit in the source code program is to be cancelled, the first version of binary of the second compiling unit is dynamically reloaded into a same address in memory as that used by the second version of the binary of the second compiling unit.

In one embodiment of the present invention, a system for dynamic code switching in debugging process, the system comprises: a compiler, running on a hardware system, configured to generate, for a source code program to be debugged, a first version of binary and a second version of binary for each compiling unit in the source code program, wherein the first version is an optimized version, the second version is a non-optimized debuggable version; and a debugger configured to: load the first version of binaries of all the compiling units in memory; monitor the user's debugging operation; in response to a determination that a compiling unit in the source code program is to be debugged, dynamically reload the second version of binary of the compiling unit in the same storing address in the memory as that of the first version of binary of the compiling unit; and in response to a determination that debugging of a compiling unit in the source code program is to be cancelled, dynamically reload the first version of binary of the compiling unit in the same storing address in the memory as that of the second version of binary of the compiling unit.

BRIEF DESCRIPTION OF THE SEVERAL VIEWS OF THE DRAWINGS

Through the more detailed description of exemplary embodiments of the present disclosure in the accompanying drawings, the above and other objects, features and advantages of the present disclosure will become more apparent, wherein the same reference generally refers to the same components in the exemplary embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
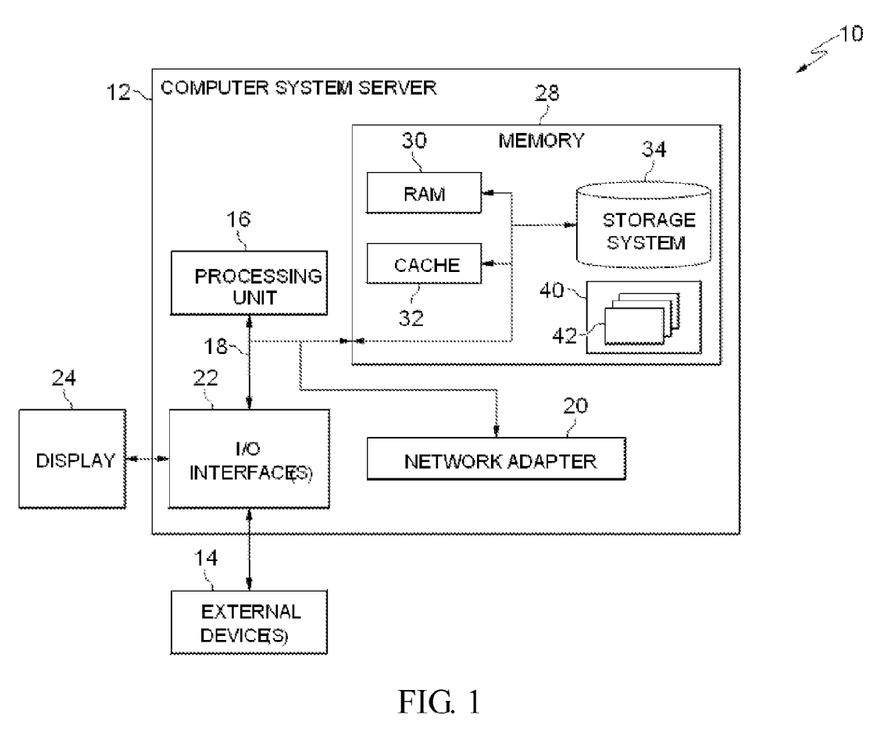
FIG. 1 shows a block diagram of an exemplary computer system/server 12 which is applicable to implement an embodiment of the present invention.

FIG. 1 shows an exemplary computer system/server 12 which is applicable to implement the embodiments of the present invention. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. Memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown in the drawing, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
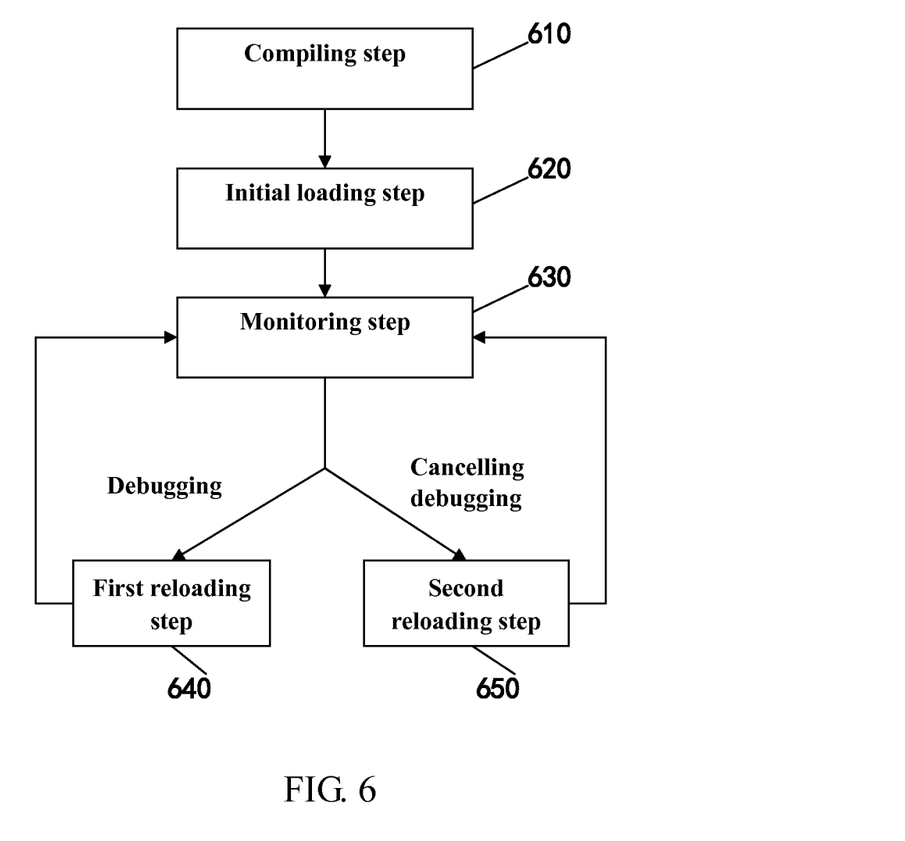
FIG. 6 is a flowchart showing a method for dynamic code switching in debugging process according to an embodiment of the present invention.

With reference now to FIG. 6, FIG. 6 is a flowchart showing a method for dynamic code switching in debugging process according to an embodiment of the present invention. The method for dynamic code switching is executed by an Integrated Development Environment (IDE) tool, for example. The IDE tool is an application program for providing a program development environment, and generally includes a code editor, a complier, a linker, a debugger and a graphical user interface, etc. The IDE tool includes, for example, Visual Studio series of Microsoft, C++ Builder, Delphi series of Borland, etc. The process in the flowchart in FIG. 6 includes the following steps: a compiling step 610, an initial loading step 620, a monitoring step 630, a first reloading step 640 and a second reloading step 650.

In the following, each step in the method for dynamic code switching of the present invention in FIG. 6 will be described in detail.

In step 610, for a source code program to be debugged, a first version of binary and a second version of binary are generated for each compiling unit in the source code program, wherein the first version is an optimized version, the second version is a non-optimized debuggable version. A compiler compiles the source code program in a unit of the compiling unit. Here, the compiling unit may be a function or a method. For example, for a function func1 in the source code program, the compiler generates optimized binary func1(opt) and non-optimized debuggable binary func1 (dbg).

Examples of said optimization may include one of function level optimization, region based optimization, basic block based optimization, and peephole based optimization. The compiler optimization is used to reduce execution time and/or space without changing logical behavior of the program. For example, optimization of a whole function may change logical behavior of one basic block; but basic block based optimization will keep consistency with the function because a basic block is a part of the function. Most of current compiler optimizations are at function level. Only some of loop optimizations are region based, some of scheduling is basic block based, and most of scalar optimizations are peephole based and inside a basic block. The present invention uses a function or a method as a unit of compiling and reloading, so as to adapt to most optimizations and still have good reloading time. In addition to the above mentioned optimization methods given as examples, optimizations used when optimized binary are generated in step 610 may also include code optimizations of various levels known in the prior art or developed in the future.

In order to achieve the dynamic code switching in the debugging process, it is critical to achieve logical equivalence of the generated two versions of binaries, and to make other parts of the executable program compatible with both of the two versions. Compatibility is important during debugging, because either version needs to be used with other parts of the program. For a function or a method, the compiler generates different symbols for the two versions of binaries that may be accessed from outside or by a linker. In order to avoid tons of work to adapt the compiler/linker to create, consume symbols of two versions of binaries in one space, in one embodiment of the present invention, a first version of binary of a compiling unit is generated through compilation with optimization of the compiling unit, a second version of binary of the compiling unit is generated through compilation without optimization of the compiling unit after modifying the name of the compiling unit. The modified name of a compiling unit is related to the original name of the compiling unit.

In one embodiment of the present invention, a function func1 is taken as an example. The compiler copies original function code, modifies the function name as func1#dbg, then compiles both of them. Specifically, for the function func1, it may be compiled with optimization by various optimization levels; for the function func1#dbg, it may be compiled without optimization. With this method, any generated binary will be compatible with the whole program.

In one embodiment of the present invention, debug information is generated only for the second version of binary. The invention's reloading mechanism (to be described in detail later) guarantees to always debug on non-optimized binary. Since debug information is not generated for the first version of binary, maintaining and switching between two versions of incompatible debug information is avoided.

In one embodiment of the present invention, in order to enable dynamic switching between two versions of binaries, it is also necessary to calculate the space (code size) in the executable, occupied by the compiled binary of one function. Specifically, code sizes of the two versions of binaries are recorded, and the larger code size is used as the occupied space.

For example, the following algorithm may be used to generate two versions of binaries of each function in a program. This algorithm is only an illustrative example, and should not be construed as any limitation to the scope of the invention. Those skilled in the art can easily think of other algorithms.

```
For each function f in program              //for each function f in the program
    Copy f to f#dbg                         //copy the function f as f#dbg
    Compile f with various optimization level
            //compile the function f with any optimization level
    opt_size = code size of f               //opt_size=code size of f
    Compile f#dbg without any optimization
            //compile the function f#dbg without optimization
    Generate debug information of f#dbg     //generate debug information of f#dbg
    dbg_size = code size of f#dbg           //dbg_size= code size of f#dbg
    Record code size of f as max(opt_size, dbg_size)
            //record code size of f as the larger one of opt_size and dbg_size
```

With the above algorithm, two versions of binaries (compiled versions of original codes) are generated, which are for example referred to as opt bin (i.e., optimized version) and dbg bin (i.e., non-optimized version) below. These two versions of binaries are linked into a same executable by a linker. In one embodiment of the present invention, the generated executable has a novel layout, which contains two versions of binaries for each function, i.e., opt bin and dbg bin. All optimized versions of binaries are grouped together in a general way (the way in which only a single version of binary is generated). However, since the larger one of code sizes of the two versions is used as the code size of the optimized version according to the above algorithm, a bubble may exist between opt bins of respective functions, which is to leave enough space for switching to dbg bins. On the other hand, dbg bins of respective functions are grouped together and stored in the "comment" section of the executable.

In one embodiment of the present invention, the first version of binary and the second version of binary of the compiling unit are contained in the same executable generated by linkage of a linker, and the second version of binary are located in the "comment" section of the executable.

In one embodiment of the present invention, the size of the space allocated to the first version of binary in the executable is equal to the larger one of code size of the first version of binary and code size of the second version of binary.

Figure 7:
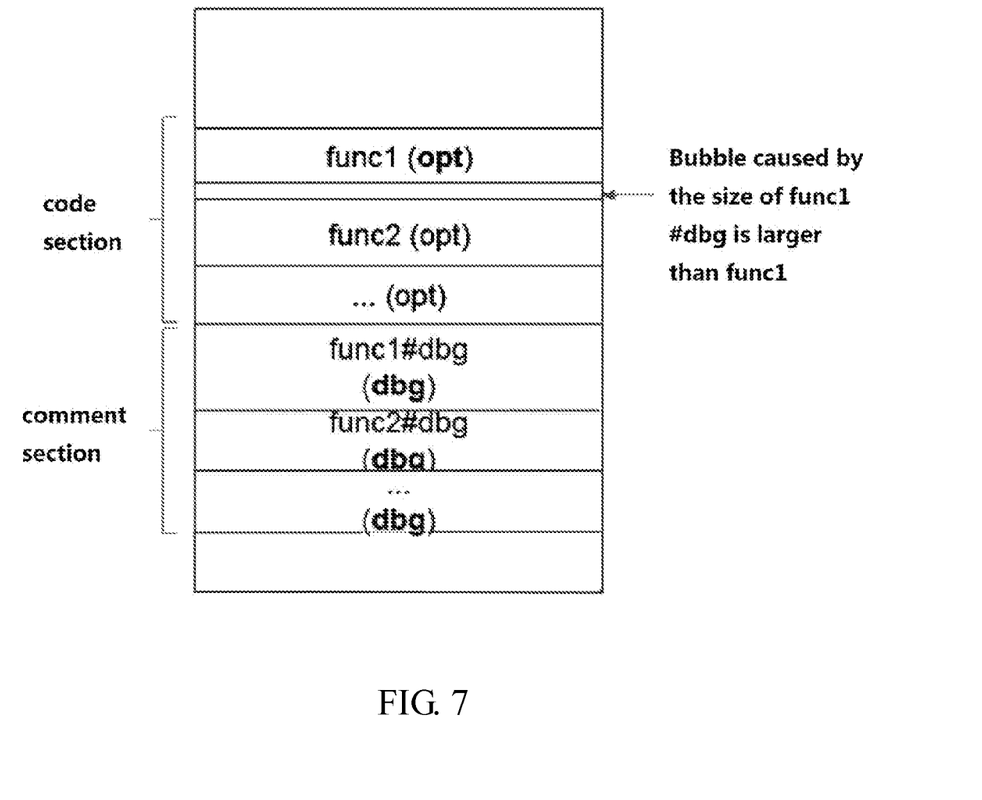
FIG. 7 schematically shows layout of an executable generated according to an embodiment of the present invention.

FIG. 7 schematically shows a layout of an executable generated according to an embodiment of the present invention. In FIG. 7, opt bins of respective functions are grouped together and stored in the code section, dbg bins of respective functions are grouped together and stored in the comment section, and a bubble between func1(opt) and func2 (opt) is shown as an example. The bubble is caused due to the fact that the code size of binary of the func1#dbg is larger than the code size of binary of the func1, and the existence of the bubble enables convenient dynamic switching between the two versions of binaries. Additionally, such layout of the present invention enables the thus generated executable programs to be run in a general debugger that cannot perform dynamic code switching, thereby achieving compatibility to some extent.

Figure 8:
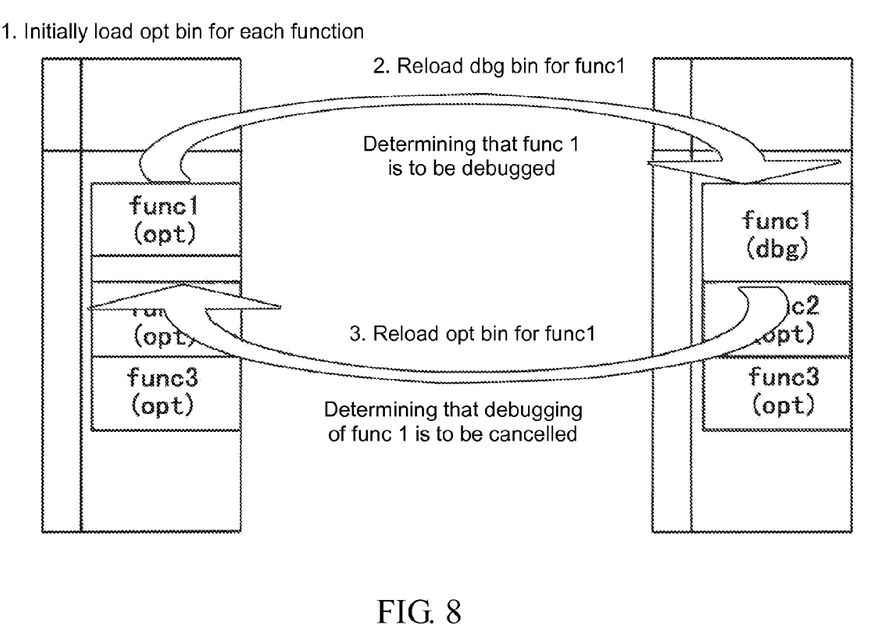
FIG. 8 schematically shows switching operation performed by a debugger.

FIG. 8 schematically shows switching operation performed by a debugger. In FIG. 8, in step 1, opt bins are loaded for all functions; in step 2, in response to a determination that func1 is to be debugged, the dbg bin is reloaded for the func1; in step 3, in response to a determination that debugging of the func1 is to be cancelled, the opt bin is reloaded for the func1. In FIG. 8, steps 2 and 3 are triggered to be performed in response to occurrence of specific events, and there is no fixed order for them.

With reference to FIG. 6 again, steps 620-650 are performed by the debugger, and correspond to the trigger behaviors in FIG. 8.

In step 620, the debugger loads the first version of binaries of all the compiling units in memory to be run by the debugger, as shown in step 1 in FIG. 8. This ensures that performance is prioritized by default. Here, it is noted that when the optimized version of binary is loaded into the memory, the bubbles are reserved in the memory so as to leave enough space for possible later code switching.

In step 630, the debugger monitors the user's debugging operation. The debugging operation refers to various debugging operations on source codes performed by the user on a source code view through a debugger. Examples of debugging operations may include: set a breakpoint, delete a breakpoint, step into, step out, step over, run to cursor, etc.

According to the result of monitoring in step 630, in step 640, in response to the determination that a compiling unit in the source code program is to be debugged, the second version of binary of the compiling unit is dynamically loaded in the same storing address in the memory as that of the first version of binary of the compiling unit. For example, step 2 in FIG. 8 may be referred to. In one embodiment, in the storing location of the first version of binary, the first version of binary and a bubble with the size equal to the difference between sizes of the first version of binary and the second version of binary are included.

According to the result of monitoring in step 630, in step 650, in response to a determination that debugging of a compiling unit in the source code program is to be cancelled, the first version of binary of the compiling unit is dynamically reloaded in the same storing address in the memory as that of the second version of binary of the compiling unit. For example, step 3 in FIG. 8 may be referred to.

According to one embodiment of the present invention, the determination that a compiling unit in the source code program is to be debugged comprises: setting a first breakpoint in a compiling unit; or debugging focus entering into a compiling unit.

According to one embodiment of the present invention, the determination that debugging of a compiling unit in the source code program is to be cancelled comprises: deleting all breakpoints in a compiling unit; or debugging focus leaving a compiling unit in which no breakpoint is set.

Only non-exhaustive examples of the determination that a function is to be debugged and the determination that debugging of a function is to be cancelled are given in the above. For example, debugging focus entering into a compiling unit (here a function or a method) may be caused by debugging operations such as step into, run to cursor, etc; debugging focus leaving a compiling unit may be caused by debugging operations such as step out, run to cursor, etc.

In the following, an example of an algorithm that may be used by a debugger to achieve dynamic code switching is given.

```
//--a case where running focus PC enters function A from function B --
When execution stops and PC changes cross, from function B to A
    If state[A] is OPT           //if state of function A is optimized
        Reload A#dbg in binary to address of A in memory    //reloading binary of A#dbg in the address of
function A in memory
        Set state[A] as DBG    //setting state of function A as debugging
    If bp_count[B] is 0           //if the number of breakpoints in function B is 0
        Reload B (opt version) in binary to address of B in memory    //reloading binary (optimized version)
of B in the address of function B in memory
        Set state[B] as OPT    //setting state of function B as optimized
//--a case of setting a breakpoint in function C--
When set break point in function C
    bp_count[C] = bp_count[C] + 1       //breakpoint counter of function C +1
    If state[C] is OPT                  //if state of function C is optimized
        Reload C#dbg in binary to address of C in memory    //reloading binary of C#dbg in the address of
function C in memory
        Set state[C] as DBG           //setting state of function C as debugging
//-- a case of deleting a breakpoint in function D --
```

-continued

```
When remove break point in function D
    bp_count[D] = bp_count[D] − 1        //breakpoint counter of function D −1
    If state[D] is DBG and bp_count[D]==0 and PC not stopping in D    //if state of function D is debugging
and breakpoint counter of function D is 0 and running focus PC does not stay in function D
        Reload D (opt version) in binary to address of D in memory    //reloading binary (optimized version)
of D in the address of function D in memory
        Set state[D] as OPT        //setting state of function D as optimized
```

The above algorithms are only illustrative examples, and should not be construed as any limitations to the scope of the invention. Those skilled in the art may readily think of other algorithms to control dynamic code switching of the debugger.

Figure 9:
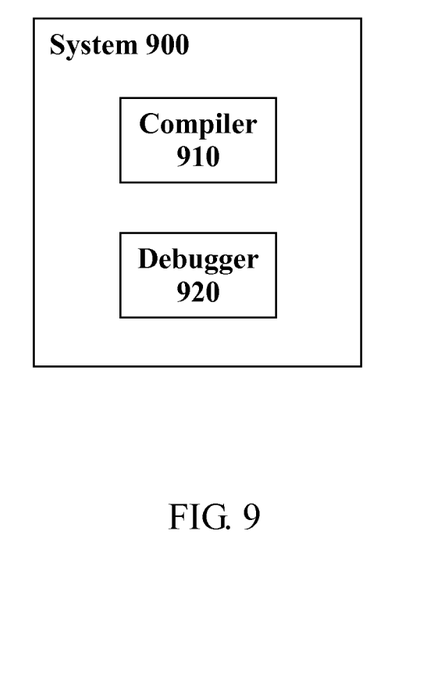
FIG. 9 is a block diagram showing a system for dynamic code switching in debugging process according to an embodiment of the present invention.

FIG. 9 is a block diagram showing a system for dynamic code switching in debugging process according to an embodiment of the present invention. The system 900 includes a compiler 910 and a debugger 920. The compiler is configured to generate, for a source code program to be debugged, a first version of binary and a second version of binary for each compiling unit in the source code program, wherein the first version is an optimized version, the second version is a non-optimized debuggable version. The debugger is configured to: load the first version of binaries of all the compiling units in memory; monitor the user's debugging operation; in response to a determination that a compiling unit in the source code program is to be debugged, dynamically reload the second version of binary of the compiling unit in the same storing address in the memory as that of the first version of binary of the compiling unit; and in response to a determination that debugging of a compiling unit in the source code program is to be cancelled, dynamically reload the first version of binary of the compiling unit in the same storing address in the memory as that of the second version of binary of the compiling unit.

In another embodiment, the system for dynamic code switching in debugging process of the present invention further includes a linker configured to generate an executable by linking the first version of binaries and the second version of binaries of all the compiling units. The second versions of binaries are located in the comment section of the executable.

Based on the above description, it is desirable to provide a dynamic code switching method and system capable of achieving both performance and debuggability in debugging process.

To solve the above technical problems, the inventor proposes a concept of dynamic code switching, and proposes a technology necessary to achieve dynamic code switching.

Thus, as described herein and according to one aspect of the present invention, there is provided a method for dynamic code switching in debugging process comprising: generating, for a source code program to be debugged, a first version of binary and a second version of binary for each compiling unit in the source code program, wherein the first version is an optimized version, the second version is a non-optimized debuggable version; loading the first version of binaries of all the compiling units in memory to be run by a debugger; monitoring a user's debugging operation; in response to a determination that a compiling unit in the source code program is to be debugged, dynamically reloading the second version of binary of the compiling unit in the same storing address in the memory as that of the first version of binary of the compiling unit; and in response to a determination that debugging of a compiling unit in the source code program is to be cancelled, dynamically reloading the first version of binary of the compiling unit in the same storing address in the memory as that of the second version of binary of the compiling unit.

According to another aspect of the present invention, there is provided a system for dynamic code switching in debugging process comprising a compiler and a debugger. The compiler is configured to generate, for a source code program to be debugged, a first version of binary and a second version of binary for each compiling unit in the source code program, wherein the first version is an optimized version, the second version is a non-optimized debuggable version. The debugger is configured to: load the first version of binaries of all the compiling units in memory; monitor the user's debugging operation; in response to a determination that a compiling unit in the source code program is to be debugged, dynamically reload the second version of binary of the compiling unit in the same storing address in the memory as that of the first version of binary of the compiling unit; and in response to a determination that debugging of a compiling unit in the source code program is to be cancelled, dynamically reload the first version of binary of the compiling unit in the same storing address in the memory as that of the second version of binary of the compiling unit.

According to a further aspect of the present invention, there is provided a system for dynamic code switching in debugging process, comprising: means for generating, for a source code program to be debugged, a first version of binary and a second version of binary for each compiling unit in the source code program, wherein the first version is an optimized version, the second version is a non-optimized debuggable version; means for loading the first version of binaries of all the compiling units in memory to be run by a debugger; means for monitoring a user's debugging operation; means for, in response to a determination that a compiling unit in the source code program is to be debugged, dynamically reloading the second version of binary of the compiling unit in the same storing address in the memory as that of the first version of binary of the compiling unit; and means for, in response to a determination that debugging of a compiling unit in the source code program is to be cancelled, dynamically reloading the first version of binary of the compiling unit in the same storing address in the memory as that of the second version of binary of the compiling unit.

The invention introduces a new framework of debugging, which is capable of achieving execution speed of optimized code and debuggability of non-optimized code simultaneously. Basically, the present invention reduces program execution time during debugging at the cost of reloading time. Since function level optimization often gives more than 50% performance improvement and reloading only occurs when manual debugging is involved, the improvement is significant.

Furthermore, since only one compiled version of each compiling unit is loaded in the memory at one moment, memory recourse is saved. In addition, since the binary version (non-optimized version) of the compiling unit for which the debugging is cancelled will be dynamically automatically switched back to the optimized version, high performance can be maintained all the time.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic code switching in a debugging process, the method comprising:
    generating, by one or more processors and for a source code program to be debugged, a first version of a binary and a second version of the binary for each compiling unit in the source code program, wherein the first version is an optimized version of the binary, wherein the second version is a non-optimized debuggable version of the binary, and wherein the first version of the binary and the second version of the binary are from a same version of a compiling unit in the source code program;
    loading, by one or more processors, optimized versions of binaries of all compiling units in memory for running by a debugger;
    monitoring, by one or more processors, a debugging operation of the source code program;
    in response to a determination that a first compiling unit in the source code program is to be debugged, dynamically reloading, by one or more processors, the second version of the binary of the first compiling unit into a first block of memory used by the first version of the binary of the first compiling unit, wherein the second version of the binary of the first compiling unit replaces the first version of the binary of the first compiling unit in the first block of memory; and
    in response to a determination that debugging of a second compiling unit in the source code program is to be cancelled, dynamically reloading, by one or more processors, the first version of the binary of the second compiling unit into a second block of memory used by the second version of the binary of the second compiling unit, wherein the first version of the binary of the second compiling unit replaces the second version of the binary of the second compiling unit in the second block of memory.

2. The method according to claim 1, wherein each compiling unit is a method.

3. The method according to claim 1, wherein determining that a compiling unit in the source code program is to be debugged comprises:
    setting, by one or more processors, a first breakpoint in a particular compiling unit; and
    setting, by one or more processors, a "debugging focus entering" command into the particular compiling unit.

4. The method according to claim 1, wherein determining that debugging of a particular compiling unit in the source code program is to be cancelled comprises:
    deleting, by one or more processors, all breakpoints in the particular compiling unit; and
    setting, by one or more processors, a "debugging focus leaving" command into the particular compiling unit in which no breakpoint is set.

5. The method according to claim 1, further comprising:
    generating, by one or more processors, debug information for the second version of binaries generated from the source code program.

6. The method according to claim 1, wherein optimizing the first version of the binary comprises one of a function level optimization, a region based optimization, a basic block based optimization, and a peephole based optimization.

7. The method according to claim 1, wherein the first version of binaries and the second version of binaries of the compiling units are contained in a same executable generated by linkage of a linker, wherein the second version of binaries are located in a comment section of the same executable, and wherein the comment section contains only text that is non-executable by a processor while stored in the comment section.

8. The method according to claim 7, wherein a space size allocated to the first version of binaries in the same executable is equal to a larger one of code size of the first version of binaries and code size of the second version of binaries.

9. The method according to claim 1, wherein a second version of a binary of a compiling unit is generated by compilation without optimization after only a name of the compiling unit is modified.

10. The method according to claim 9, wherein the modified name of the compiling unit is related to an original name of the compiling unit.

11. A computer system comprising:
    a processor, a computer readable memory, and a computer readable storage medium;
    first program instructions to generate, for a source code program to be debugged, a first version of a binary and a second version of the binary for each compiling unit in the source code program, wherein the first version is an optimized version of the binary, wherein the second version is a non-optimized debuggable version of the binary, and wherein the first version of the binary and the second version of the binary are from a same version of a compiling unit in the source code program;

second program instructions to load optimized versions of binaries of all compiling units in memory for running by a debugger;

third program instructions to monitor a debugging operation of the source code program;

fourth program instructions to, in response to a determination that a first compiling unit in the source code program is to be debugged, dynamically reload the second version of the binary of the first compiling unit into a first block of memory used by the first version of the binary of the first compiling unit, wherein the second version of the binary of the first compiling unit replaces the first version of the binary of the first compiling unit in the first block of memory; and fifth program instructions to, in response to a determination that debugging of a second compiling unit in the source code program is to be cancelled, dynamically reload the first version of binary of the second compiling unit into a second block of memory used by the second version of the binary of the second compiling unit, wherein the first version of the binary of the second compiling unit replaces the second version of the binary of the second compiling unit in the second block of memory; and wherein the first, second, third, fourth, and fifth program instructions are stored on the computer readable storage medium, and wherein the first, second, third, fourth, and fifth program instructions are executed by the processor via the computer readable memory.

12. The computer system according to claim 11, wherein each compiling unit is a method.

13. The computer system according to claim 11, wherein determining that a compiling unit in the source code program is to be debugged comprises:

sixth program instructions to set a first breakpoint in a particular compiling unit; and seventh program instructions to set a "debugging focus entering" command into the particular compiling unit; and wherein the sixth and seventh program instructions are stored on the computer readable storage medium, and wherein the sixth and seventh program instructions are executed by the processor via the computer readable memory.

14. The computer system according to claim 11, wherein determining that debugging of a particular compiling unit in the source code program is to be cancelled comprises:

sixth program instructions to delete all breakpoints in the particular compiling unit; and seventh program instructions to set a "debugging focus leaving" command into the particular compiling unit in which no breakpoint is set; and wherein the sixth and seventh program instructions are stored on the computer readable storage medium, and wherein the sixth and seventh program instructions are executed by the processor via the computer readable memory.

15. The computer system according to claim 11, further comprising:

sixth program instructions to generate debug information for the second version of binaries generated from the source code program; and wherein the sixth program instructions are stored on the computer readable storage medium, and wherein the sixth program instructions are executed by the processor via the computer readable memory.

16. The computer system according to claim 11, wherein optimizing the first version of the binary comprises one of a function level optimization, a region based optimization, a basic block based optimization, and a peephole based optimization.

17. The computer system according to claim 11, wherein the first version of binaries and the second version of binaries of the compiling units are contained in a same executable generated by linkage of a linker, wherein the second version of binaries are located in a comment section of the same executable, and wherein the comment section contains only text that is non-executable by a processor while stored in the comment section.

18. The computer system according to claim 17, wherein a space size allocated to the first version of binaries in the same executable is equal to a larger one of code size of the first version of binaries and code size of the second version of binaries.

19. The method of claim 1, wherein debug information is not generated for the first version of the binary.

20. A computer program product for dynamic code switching in a debugging process, the computer program product comprising a non-transitory computer readable storage medium having program code embodied therewith, the program code readable and executable by a processor to perform a method comprising:

generating, for a source code program to be debugged, a first version of a binary and a second version of the binary for each compiling unit in the source code program, wherein the first version is an optimized version of the binary, wherein the second version is a non-optimized debuggable version of the binary, and wherein the first version of the binary and the second version of the binary are from a same version of a compiling unit in the source code program;

loading optimized versions of binaries of all compiling units in memory for running by a debugger;

monitoring a debugging operation of the source code program;

in response to a determination that a first compiling unit in the source code program is to be debugged, dynamically reloading the second version of the binary of the first compiling unit into a first block of memory used by the first version of the binary of the first compiling unit, wherein the second version of the binary of the first compiling unit replaces the first version of the binary of the first compiling unit in the first block of memory; and in response to a determination that debugging of a second compiling unit in the source code program is to be cancelled, dynamically reloading the first version of binary of the second compiling unit into a second block of memory used by the second version of the binary of the second compiling unit, wherein the first version of the binary of the second compiling unit replaces the second version of the binary of the second compiling unit in the second block of memory.

* * * * *